United States Patent [19]

Worrell

[11] Patent Number: 4,778,249

[45] Date of Patent: Oct. 18, 1988

[54] MIDDLE INFRA-RED HOLLOW OPTICAL FIBRES AND A METHOD FOR FORMING THEM

[75] Inventor: Clive A. Worrell, Sussex, United Kingdom

[73] Assignee: Cogent Limited, London, England

[21] Appl. No.: 823,506

[22] PCT Filed: May 24, 1985

[86] PCT No.: PCT/GB85/00223

§ 371 Date: Jan. 7, 1986

§ 102(e) Date: Jan. 7, 1986

[87] PCT Pub. No.: WO85/05350

PCT Pub. Date: Dec. 5, 1985

[30] Foreign Application Priority Data

Jun. 5, 1984 [GB] United Kingdom ............... 8414264

[51] Int. Cl.⁴ .................................................. G02B 6/20
[52] U.S. Cl. .................................... 350/96.32; 65/3.12; 65/3.31; 65/33; 350/96.34
[58] Field of Search ............... 350/96.33, 96.34, 96.32; 65/3.12, 3.31, 33

[56] References Cited

U.S. PATENT DOCUMENTS

| | | | |
|---|---|---|---|
| 3,436,141 | 4/1969 | Comte | 350/96.33 X |
| 3,961,926 | 6/1976 | Asam | 65/3.12 |
| 4,125,388 | 11/1978 | Powers | 65/3.12 |
| 4,145,458 | 3/1979 | Koenings et al. | 65/3.12 X |
| 4,209,229 | 6/1980 | Rittler | 350/96.34 |
| 4,453,803 | 6/1984 | Hidaka et al. | 350/96.32 |

Primary Examiner—John Lee
Attorney, Agent, or Firm—Larson and Taylor

[57] ABSTRACT

A hollow optical fibre waveguide for low loss transmission at mid infra-red wavelengths, and particularly in the region of the $CO_2$ laser wavelength of 10.6 microns, is made of a germanium dioxide based glass, preferably comprising not less than 80 wt. % $GeO_2$ and not more than 20 wt. % PbO, and has at least the inner surface of the hollow glass fibre devitrified and/or provided with a thin germanium lining. This change at the inner surface of the hollow fibre reduces transmission loss at the wavelengths of interest, and is effected by heat treatment at a temperature of at least 400° C., simultaneously with exposure of the inner surface to a reducing atmosphere if a thin germanium layer is required at the inner surface.

26 Claims, 3 Drawing Sheets

MIDDLE INFRA-RED HOLLOW OPTICAL FIBRES AND A METHOD FOR FORMING THEM

This invention relates to hollow optical fibres for low loss transmission of high energy radiation in the mid infra-red region, and is particularly concerned with such a fibre for transmitting energy from a carbon dioxide laser at a wavelength of 10.6 microns (μm).

Although in recent years comparatively cheap and compact high powered gas lasers such as the $CO_2$ laser particularly in the fields of medicine, communications, and industrial engineering, has been restricted by the absence of a suitable flexible transmission system. For example, the properties of laser energy at wavelengths in the region of 10.6 μm in relation to biological tissue make the $CO_2$ laser potentially very useful medically, particularly in the surgical field where the laser enables very precise and well controlled incisions to be made. However, the absence of a compact, flexible and manoeuvreable low loss transmission system has limited the surgical use of the $CO_2$ laser mainly to direct line of sight operations. Some endoscopic surgery has been carried out using an articulated arm with mirrors mounted on mechanical joints, but this system is very restrictive and unwieldly. Clearly the provision of a flexible optical fibre suitable for surgical use and capable of low loss transmission of $CO_2$ laser energy would really enable the surgical potential of the $CO_2$ laser to be properly realized.

Conventional optical fibres made of glass cannot be used since most glasses, in common with many other inorganic materials, exhibit strong absorption characteristics at mid infra-red frequencies due to resonance effects in the molecular structure, and are therefore substantially opaque to such radiation. Optical fibres which do transmit in the mid infra-red range have, however, been made from certain alkali halides, for example thallous-bromo-iodide, commonly known as KRS5, but it is very difficult and expensive to manufacture suitable fibres from these materials due to their crystalline nature and the high level of purity which is necessary to achieve good transmission. Furthermore, KRS5 is chemically toxic, has poor chemical stability in terms of moisture resistance, and thermally degrades at comparatively low temperatures, which does not render it very suitable for surgical use.

To overcome this problem it has been proposed to make a mid infra-red transmitting optical fibre in the form of a flexible hollow core waveguide so that relatively low loss transmission of radiation in the relevant frequency range can be effected through the hollow core of the fibre. Various proposals for such hollow core optical fibre waveguides have been made, such as hollow circular metallic waveguides, dielectric coated hollow metallic waveguides, and hollow glass waveguides, but it is to hollow optical fibre waveguides of the last type which the present invention particularly relates.

The operation of a hollow core glass fibre waveguide is based on the fact that the absorption and dispersion characteristics of an oxide glass at mid infra-red frequencies, referred to as anomalous dispersion effects, cause the real part (n) of the complex refractive index ($N = n - iK$ where K is the extinction or loss coefficient and is related to the attenuation or absorption coefficient) of the glass to become less than unity over a range of wavelengths (e.g. 7.5 to 9 μm for silica based glasses), with the result that in this range radiation incident from the core on the inner wall of the hollow fibre at an angle greater than the critical angle will be substantially totally internally reflected.

The transmission loss of such a hollow optical fibre waveguide at any given wavelength will of course depend on the fibre geometry and the surface quality of the inner wall of the fibre, but will also depend on the values of n and K at the said wavelength. A zero K value will give zero attentuation of the internally reflected radiation, but in practice this is virtually impossible to achieve since it is a relatively high value of K which gives rise to the refractive index n being less than 1 which in turn provides the total internal reflecting property of the fibre. For any given glass however, the maximum value of K is at a slightly longer wavelength than the minimum value of the refractive index, and generally speaking the minimum transmission loss of a hollow fibre waveguide made from the glass will be at a wavelength slightly shorter than the minimum value of the refractive index. Also, since these values will depend on the atomic mass and molecular structure of the glass, it follows that the nature of the glass from which the fibre is made will very much affect the performance (i.e. the transmission efficiency) of the fibre at a given wavelength.

It has been determined that the minimum refractive index of pure germanium dioxide ($GeO_2$) glass is at a wavelength very close to the $CO_2$ laser wavelength of 10.6 μm (943 $cm^{-1}$), and it is considered that $GeO_2$ based glasses will enable hollow optical fibre waveguides to be produced having very low transmission loss values in the region of the $Co_2$ laser wavelength. Indeed, a hollow optical fibre waveguide made from a glass consisting of 80 mol % germanium dioxide, 10 mol % zinc oxide and 10 mol % potassium oxide, and having its minimum transmission loss at 940 $cm^{-1}$, is described in a paper by T. Hidaka et al published in The American Journal of Applied Physics, Vol. 53, 1982, pages 5484 to 5490.

With the aim of reducing the transmission loss of such hollow optical fibre waveguides still further, at least at the wavelengths of interest, according to the present invention, we propose a hollow optical fibre waveguide which is made from a germanium dioxide based glass and in which at least the inner surface of the hollow glass fibre has been devitrified and/or provided with a thin germanium lining.

Devitrification of the glass, which may be carried out by heating the hollow fibre at a temperature between 400° and 1300° C. for a period up to 48 hours, changes it from a vitreous to a crystalline glass-ceramic state. The presence of long range translational symmetry in the crystalline glass-ceramic molecular structure gives rise to more localised and intense molecular and electronic transitions in the regions of the spectrum where the selection rules predict optical activity. This significantly affects the absorption and dispersion characteristics of the original glass and, in turn, gives rise to further reductions in the values of the refractive index (n) and the extinction coefficient (K), and hence the transmission loss at wavelengths in the region of interest, i.e. in the region of the $CO_2$ laser wavelength of 943 $cm^{-1}$.

To assist the devitrification process, the glass composition may include at least one glass modifying and/or nucleating agent selected from the oxides of lead, titanium, phosphorus, cerium, zinc, lithium, sodium, potassium, calcium, zirconium, barium, aluminium, magnesium, antimony, bismuth, and arsenic.

Providing the hollow glass fibre waveguide with a thin inner lining of germanium will reduce the transmission loss of the hollow fibre, particularly the bending losses, in a manner similar to that predicted and observed for dielectric coated hollow metallic waveguides (described for example in a paper by M. Miyagi et al published on pages 430 to 432 of Applied Physics Letters, 43(5), September 1983). The lining should be sufficiently thin that the hollow fibre waveguide does not act optically as if it were made wholly of germanium, and a thickness of the order of 0.5 microns is considered suitable for the germanium layer.

The germanium layer at the inner surface of the hollow glass fibre waveguide may be formed very easily, simply by heating the fibre to a suitably high temperature while exposing at least the inner surface of the hollow fibre to a reducing atmosphere so that the germanium oxide of the glass is reduced to germanium at the inner surface of the fibre. The reducing atmosphere preferably contains hydrogen, and may comprise a mixture of 90 vol % nitrogen and 10 vol % hydrogen. Since it will not matter if the glass at the outer surface of the hollow optical fibre waveguide is reduced to germanium as well as the glass at the inner surface, the fibre may simply be placed in the reducing atmosphere while it is heated, but it may be preferably to pump the reducing atmosphere through the core of the hollow fibre while the fibre is heated, in order to ensure the production of a uniform germanium lining at the inner surface.

The temperature to which the hollow optical fibre is heated for the purpose of the reducing treatment is preferably between 400° and 850° C., preferably 650° C., and advantageously the reducing treatment may be effected simultaneously with heat treatment to devitrify the inner surface of the hollow glass fibre or even the whole of the fibre.

Preferably the composition of the germanium dioxide based glass comprises not less than 80 wt. % germanium dioxide and not more than 20 wt. % lead oxide, preferably from 90 to 95 wt. % germanium dioxide and from 5 to 10 wt. % lead oxide, and possibly also at least one of the other modifying and/or nucleating agents mentioned earlier.

The invention will now be described further with reference to examples and the accompanying drawings, in which.

Figure 3:
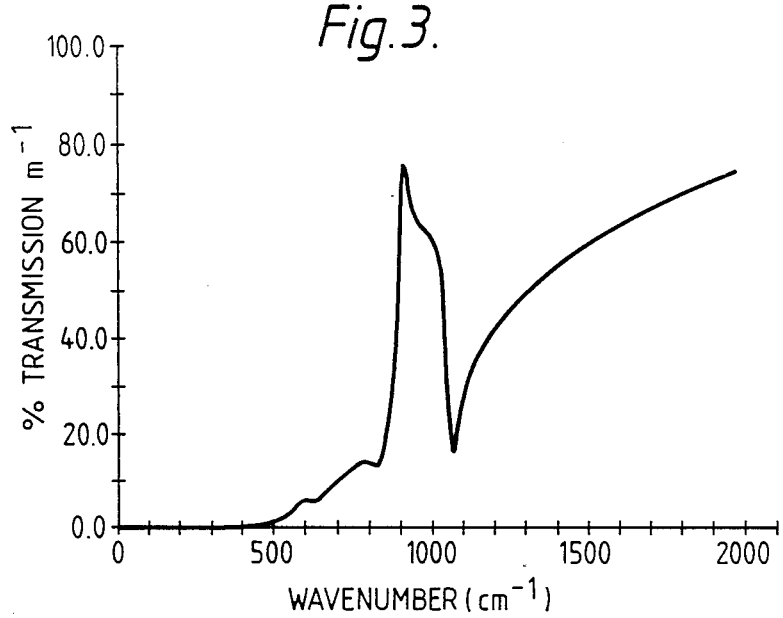
FIG. 3 is a graph illustrating the variation in transmission with wavelength in the mid infra-red region predicted for a hollow optical fibre waveguide made of vitreous germanium dioxide and having a bore diameter of 0.5 mm.
Figure 4:
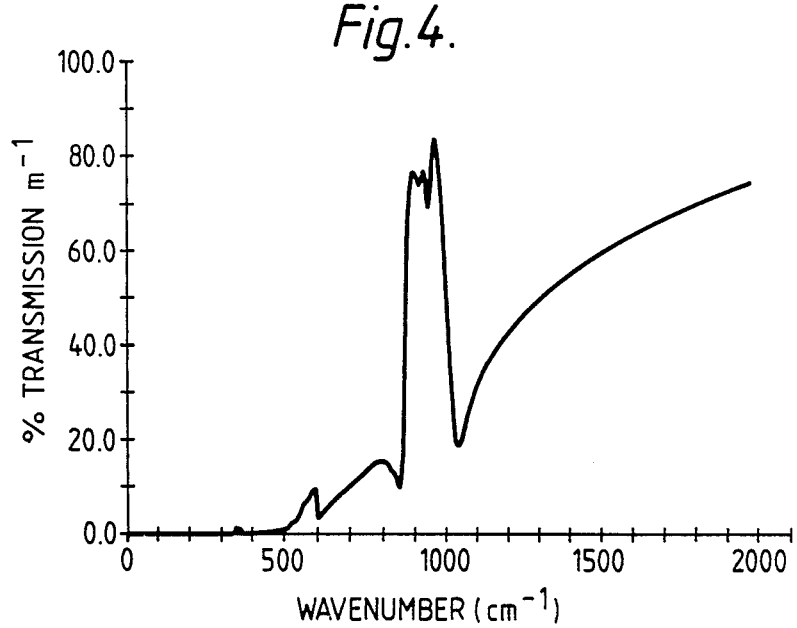
Figure 5:
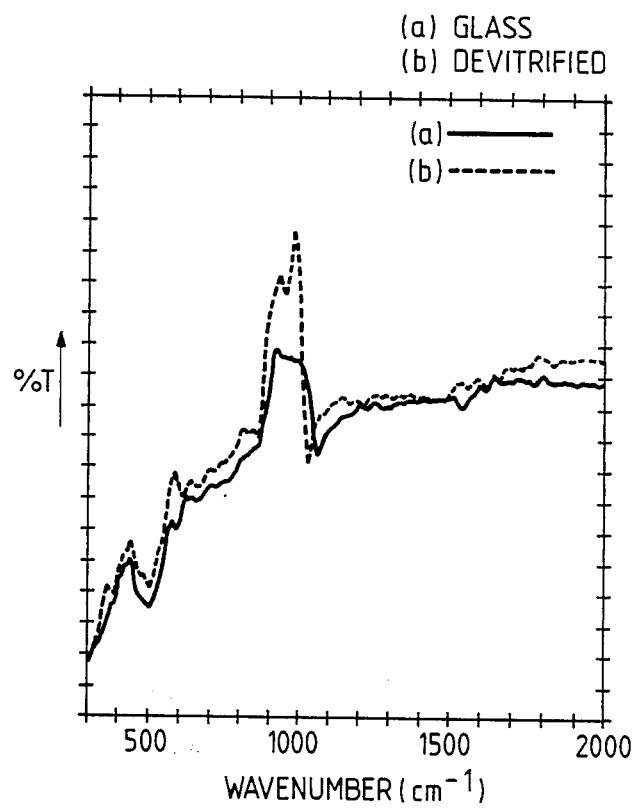

FIG. 4 is a graph similar to that of FIG. 3 but illustrating the variation in transmission predicted for the waveguide when made of devitrified germanium dioxide; and, FIG. 5 is a graph illustrating the relative variation in transmission with wavelength in the mid infra-red region determined experimentally for (a) a hollow optical fibre waveguide having a bore of 0.5 mm and made of glass comprising 95 wt. % germanium dioxide and 5 wt. % lead oxide, and (b) the same hollow optical fibre waveguide after the glass has been devitrified.

Figure 1:
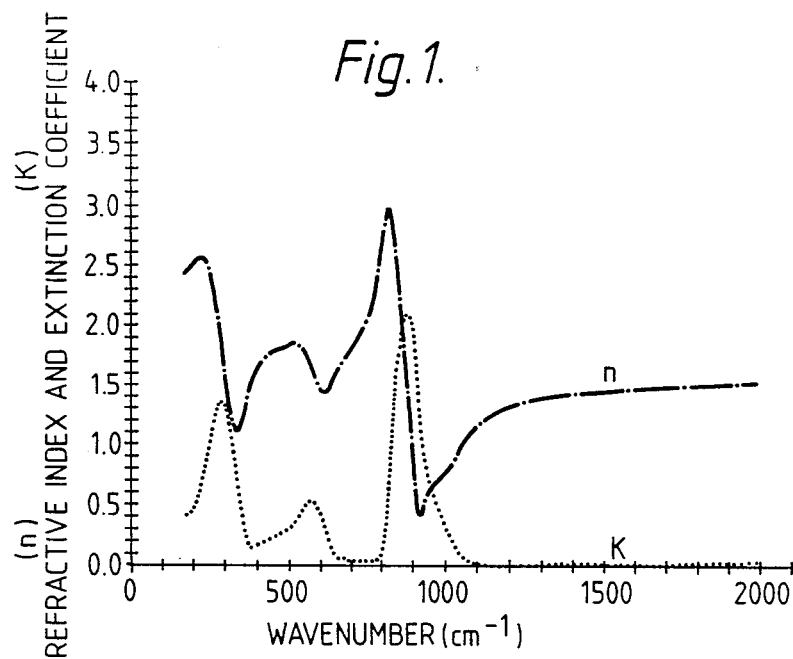
FIG. 1 is a graph illustrating the measured variation of refractive index (n) and extinction coefficient (K) with wavelength in the mid infra-red region for vitreous germanium dioxide.
Figure 2:
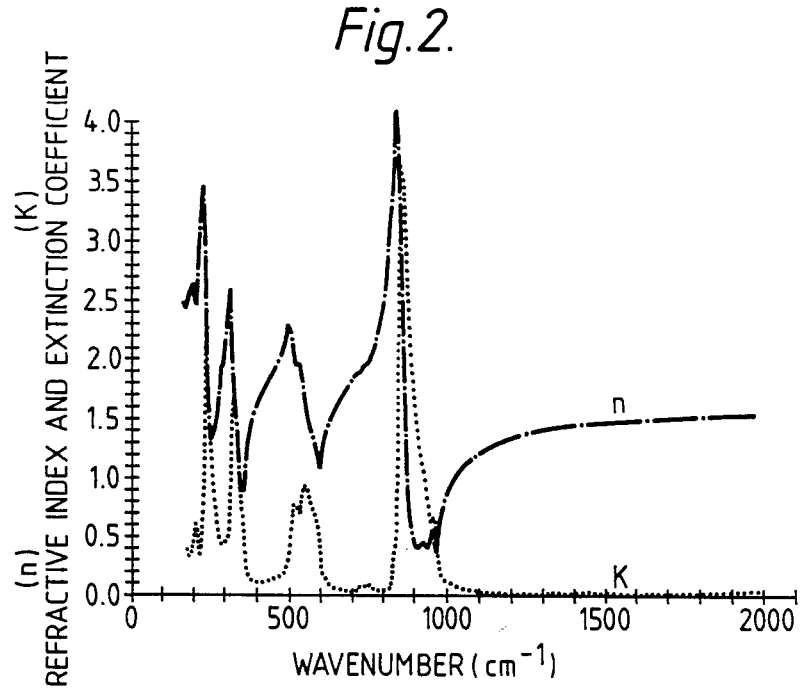
FIG. 2 is a graph similar to that of FIG. 1 but illustrating the variation of the refractive index and the extinction coefficient for devitrified germanium dioxide.

As seen from FIG. 1, the refractive index and extinction co-efficient for pure germanium dioxide glass are approximately 0.6 and 0.8 respectively in the region of the $CO_2$ laser wavelength of 10.6 microns (943 $cm^{-1}$). As mentioned earlier, a refractive index of less than unity will make a hollow optical fibre made from the glass totally internally reflecting, and if further reductions in the refractive index can be made at the wavelengths of interest the transmission of the fibre may be improved. FIG. 2 shows the measured values for the refractive index and the extinction coefficient at mid infra-red wavelengths for pure germanium dioxide glass which has undergone phase conversion from the vitreous state to the crystalline state, the refractive index and extinction coefficient being approximately 0.4 and 0.8 respectively at 943 $cm^{-1}$.

To demonstrate the advantage of this phase conversion and the reduction in refractive index in the region of the $CO_2$ laser wavelength, the transmission for hollow optical fibre waveguides made of the materials of FIGS. 1 and 2 has been predicted using a ray optic calculation assuming a circular cross-section for the hollow fibre waveguide. The parameters required for this calculation are the refractive index, extinction coefficient, the internal diameter of the hollow fibre waveguide (0.5 mm has been assumed), and the wavelength. In FIG. 3 the transmission (percentage transmission per metre) against wavelength predicted for the vitreous germanium dioxide hollow optical fibre is presented, and in FIG. 4 corresponding data is presented for a corresponding fibre in which the glass has been devitrified. At a wavelength of 10.6 microns (953 $cm^{-1}$) the transmission predicted for the germanium glass fibre is 68%, compared with 77% for the devitrified fibre. Furthermore, the maximum transmission predicted for the vitreous fibre is 76% at 925 $cm^{-1}$, compared with 84% for devitrified fibre at 972 $cm^{-1}$. This wave number range is within the tunability of the $CO_2$ laser.

To further illustrate the benefits of the invention, as an example, a glass composition of 95 weight % germanium dioxide and 5 weight % lead oxide was melted and drawn into hollow fibres of 0.5 mm internal diameter, and the spectral transmission characteristics for the fibre were measured at wavelengths in the mid infra-red region. The fibre was then heated to a temperature of about 700° C. in a furnace chamber for a period of about 5 minutes, in which time the fibre was devitrified and changed substantially completely to a crystalline glass-ceramic state, and the spectral transmission characteristics of the fibre were remeasured. The results of these measurements are presented in FIG. 5, which shows that in the case of the devitrified glass fibre a marked increase in transmission is achieved in the region of the $CO_2$ laser wavelength.

Finally, as mentioned earlier, it is also within the scope of the invention to improve the transmission of a hollow optical fibre waveguide made of a germanium dioxide based glass by forming a thin layer of germanium at the inner surface of the waveguide, either with or without devitrification of the glass. The feasibility of forming the germanium layer by reducing the germanium dioxide at the surface of the fibre has been demonstrated by heating a piece of pure germanium dioxide glass to a temperature of 650° C. in an atmosphere comprising 90% nitrogen and 10% hydrogen. A thin germanium layer at the surface of the glass was formed relatively quickly, the thickness of the layer being controllable by the time and temperature of the treatment.

An additional advantage which is obtained by forming a laser transmitting hollow optical $GeO_2$ glass fibre with a thin germanium surface layer is that the layer is sufficiently electrically conducting for it to be incorporated in an electrical safety device designed to shut off the laser in the event of fibre failure.

I claim:

1. A hollow optical fibre waveguide which is made from a germanium dioxide based glass and in which at least the inner surface of the hollow glass fibre has been devitrified so as to substantially decrease the transmission loss in the midrange infrared region from about 850 $cm^{-1}$ to about 1000 $cm^{-1}$ or provided with a thin germanium lining.

2. A hollow optical fibre waveguide which is made from a germanium dioxide based glass and in which at least the inner surface of the hollow glass fibre has been devitrified and provided with a thin germanium lining.

3. A method of treating a hollow optical fibre waveguide made from a germanium dioxide based glass so as to reduce the transmission loss of the fibre at a predetermined wavelength, in which the fibre is heated so that at least the inner surface of the hollow fibre is devitrified so as to substantially decrease the transmission loss of the fibre in the midrange infrared region from about 850 $cm^{-1}$ to about 1000 $cm^{-1}$.

4. A method according to claim 3, in which the fibre is heated at a temperature between 400° and 1300° C. for a period up to 48 hours.

5. A method according to claim 3, in which at least the inner surface of the hollow fibre is also exposed to a reducing atmosphere so that a thin germanium lining is formed at the inner surface.

6. A method according to claim 5, in which the reducing atmosphere contains hydrogen.

7. A method according to claim 6, in which the reducing atmosphere comprises 90 vol % nitrogen and 10 vol % hydrogen.

8. A method according to claim 5, in which the reducing atmosphere is pumped through the core of the hollow fibre.

9. A method according to claim 5, in which the fibre is heated to a temperature between 400° and 850° C.

10. A method according to claim 9, in which the fibre is heated to a temperature of 650° C.

11. A method according to claim 5, in which the thickness of the germanium lining is of the order of 0.5 microns.

12. A method according to claim 3, in which the fibre is heated so that the whole of the hollow glass fibre is devitrified.

13. A method according to claim 3, in which the composition of the germanium dioxide based glass comprises not less than 80 wt. % germanium dioxide and not more than 20 wt. % lead oxide.

14. A method according to claim 13, in which the composition of the glass comprises from 90 to 95 wt. % germanium dioxide and from 5 to 10 wt. % lead oxide.

15. A method according to claim 3, in which the composition of the germanium dioxide based glass includes at least one glass modifying and/or nucleating agent which promotes devitrification of the glass and which is selected from the oxides of lead, titanium, phosphorus, cerium, zinc, lithium, sodium, potassium, calcium, zirconium, barium, aluminum, magnesium, antimony, bismuth, and arsenic.

16. A method of treating a hollow optical fibre waveguide made from a germanium dioxide based glass so as to reduce the transmission loss of the fibre at a predetermined wavelength, in which the fibre is heated while exposing at least the inner surface of the hollow fibre to a reducing atmosphere so that a thin lining of germanium is formed at the inner surface.

17. A method according to claim 16, in which the fibre is heated at a temperature between 400° and 1300° C. for a period of up to 48 hours.

18. A method according to claim 16, in which the reducing atmosphere contains hydrogen.

19. A method according to claim 18, in which the reducing atmosphere comprises 90 vol % nitrogen and 10 vol % hydrogen.

20. A method according to claim 16, in which the reducing atmosphere is pumped through the core of the hollow fibre.

21. A method according to claim 16, in which the fibre is heated to a temperature between 400° and 850° C.

22. A method according to claim 21, in which the fibre is heated to a temperature of 650° C.

23. A method according to claim 16, in which the thickness of the germanium lining is of the order of 0.5 microns.

24. A method according to claim 16, in which the composition of the germanium dioxide based glass comprises not less than 80 wt. % germanium dioxide and not more than 20 wt. % lead oxide.

25. A method according to claim 24, in which the composition of the glass comprises from 90 to 95 wt. % germanium dioxide and from 5 to 10 wt. % lead oxide.

26. A method according to claim 16, in which the composition of the germanium dioxide based glass includes at least one glass modifying and/or nucleating agent which promotes devitrification of the glass and which is selected from the oxides of lead, titanium, phosphorus, cerium, zinc, lithium, sodium, potassium, calcium, zirconium, barium, aluminum, magnesium, antimony, bismuth, and arsenic.

* * * * *